Patented Aug. 31, 1954

2,688,026

UNITED STATES PATENT OFFICE 2,688,026

BASICALLY SUBSTITUTED PIPERONYL-AMIDES AND THEIR SALTS

Carl Peter Krimmel, Mundelein, Ill., assignor to G. D. Searle & Co., Chicago, Ill., a corporation of Illinois No Drawing. Application October 24, 1951,
Serial No. 252,999

6 Claims. (Cl. 260—340.5)

1

The present invention relates to a new group of organic amides and, specifically, to the basically substituted piperonylamides of the structural formula

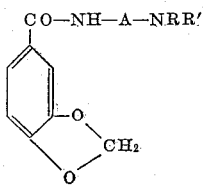

wherein A is a lower, bivalent, saturated, aliphatic hydrocarbon radical, and NRR' is either a lower dialkylamino radical or a nitrogen-containing heterocyclic radical attached through a nitrogen in the heterocycle to the radical A.

In the foregoing structural formula, the radical A is selected from such straight-chained or branch-chained hydrocarbon radicals as ethylene, propylene, butylene, amylene, hexylene, heptylene, and octylene, or polymethylene radicals such as trimethylene, tetramethylene, pentamethylene, hexamethylene, heptamethylene, and octamethylene.

Of special interest for the purpose of this invention are the compounds in which the radicals R and R' are lower alkyl radicals such as methyl, ethyl, and straight-chained and branch-chained propyl, butyl, and hexyl. The radical NRR' can also be a nitrogen-containing heterocyclic radical such as a piperazino, N'-alkylpiperazino, morpholino, thiamorpholino, quinolino, and isoquinolino radical, or a radical of the type

wherein B is a lower alkylene group containing 4 to 7 carbon atoms, 4 or 5 of which are in nuclear position, as in the case of pyrrolidino, piperidino, 2,5-dimethylpyrrolidino, and 2,6-lupetidino radicals.

For certain of the purposes of this invention it is preferable to employ the salts of the organic bases described herein. These bases form salts with a variety of inorganic and strong organic acids including sulfuric, phosphoric, hydrochloric, hydrobromic, hydriodic, sulfamic, acetic, benzoic, citric, lactic, maleic, malic, succinic, tartaric, cinnamic, gluconic, ascorbic, and related acids. They also form quaternary ammonium salts with a variety of organic esters of sulfuric, hydrohalic, and aromatic sulfonic acids. Among such esters are methyl chloride, bromide, and iodide; the ethyl halides, propyl halides, butyl halides, isobutyl halides, benzyl halides, phenethyl halides, naphthylmethyl halides, dimethyl sulfate, methyl benzenesulfonate, ethyl toluenesulfonate, ethylene chlorohydrin, ethylene bromohydrin, the propylene halohydrins, allyl halides, methallyl halides, and crotyl halides.

The amides described in the present application are valuable as intermediates in organic synthesis. They are potent medicinal agents because of their effects on the cardiovascular, renal, and autonomic nervous systems, particularly as antihypertensive and diuretic agents.

My invention will appear more fully from the following examples which are set forth for the purpose of illustrating this invention but are in no way to be construed as limiting it in spirit or in scope. In each of these examples quantities of materials are expressed as grams (g.) and milliliters (ml.), temperatures as degrees centigrade (° C.), and pressures during vacuum distillation in millimeters (mm.) of mercury.

Example 1

A mixture of 40 g. of piperonylic acid and 72 g. of thionyl chloride is heated on the steam bath for 3 hours. The excess thionyl chloride is removed on the steam bath by vacuum distillation. The piperonylic acid chloride residue, an oil which crystallizes upon standing, is used without further purification in the following syntheses.

Example 2

The acid chloride residue obtained from 40 g. of piperonylic acid is dissolved in 500 ml. of acetone. To this solution 27.8 g. of β-diethylaminoethylamine is added dropwise with stirring. The reaction mixture is refluxed on the steam bath for 3 hours, the acetone is stripped under vacuum, and the residue is taken up in water. The aqueous layer is freed of neutral impurities by ether extraction. It is then separated and made alkaline with potassium hydroxide solution. The released oil is ether extracted, dried over anhydrous potassium carbonate, filtered, ether stripped, and vacuum distilled. The N-(β-diethylaminoethyl) piperonylamide, an amber-colored oil, is collected at about 234–238° C. and 6 mm. pressure.

Eaxample 3

An equivalent of 25% hydrogen chloride in anhydrous isopropanol is added with stirring to 21.1 g. of the above base in 60 ml. of butanone. Crystallization of the hydrochloride is induced by diluting several drops of the reaction mixture with anhydrous ether to precipitate a gum, dissolving the gum in a minimum of hot butanone, cooling, and scratching. With the seed crystals thus obtained, the hydrochloride is precipitated from the reaction solution as a microcrystalline powder.

Recrystallization from butanone yields straw colored needles of the hydrochloride of N-(β-diethylaminoethyl)piperonylamide melting at 135–137° C.

*Example 4*

A solution of 13.2 g. of N-(β-diethylaminoethyl)piperonylamide, 10.9 g. of ethyl bromide, and 30 ml. of methyl ethyl ketone is sealed in a shielded pressure bottle and heated in the steam bath for 3 hours. Observing the usual precautions, the pressure bottle is cooled and opened. The crystalline product is filtered, washed by suspension in butanone and dried in the steam cabinet. Recrystallization from isopropanol yields white crystals melting at 177.0–178.5° C. The β - piperonylamidoethyltriethylammonium bromide thus obtained has the structural formula

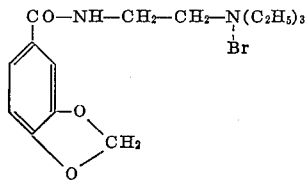

*Example 5*

The acid chloride residue obtained from 50 g. of piperonylic acid is dissolved in 500 ml. of acetone. To this solution 39.0 g. of γ-diethylaminopropylamine is added dropwise with stirring. The reaction mixture is then treated as in the foregoing example to obtain the N-(γ-diethylaminopropyl)piperonylamide as a pale yellow oil which is collected at about 226–232° C. and 2.5 mm. pressure.

*Example 6*

An equivalent of 25% hydrogen chloride in anhydrous isopropanol is added with stirring to 27.8 g. of N-(γ-diethylaminopropyl)piperonylamide in 80 ml. of butanone. The hydrochloride is seeded as in Example 3. Recrystallization from isopropanol yields white crystals melting at 134–137° C.

*Example 7*

A solution of 18.0 g. of N-(γ-diethylaminopropyl)piperonylamide, 14.2 g. of ethyl bromide, and 30 ml. of butanone is sealed in a shielded pressure bottle and heated in the steam bath for 3 hours. Observing the usual precautions, the pressure bottle is cooled and opened. The crystalline product is filtered, washed by suspension in butanone, and dried in the steam cabinet. Recrystallization from isopropanol yields white crystals melting at 180–183° C. The γ-piperonylamidopropyltriethylammonium bromide has the structural formula

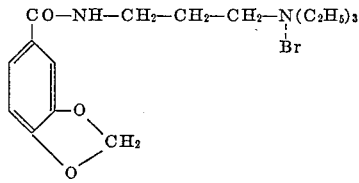

*Example 8*

The acid chloride residue obtained from 50 g. of piperonylic acid is dissolved in 500 ml. of anhydrous ethyl ether. To this solution 47.4 g. of ω-diethylaminopentylamine is added dropwise with stirring. The gum which separates is dissolved in 500 ml. of water and separated from the ether layer. The aqueous solution is made alkaline with sodium hydroxide solution. The released oil is ether extracted, dried over anhydrous potassium carbonate, filtered, ether stripped, and vacuum distilled at about 250–260° C. and 0.5–1.0 mm. pressure. The N-(ω-diethylaminopentyl)piperonylamide has the structural formula

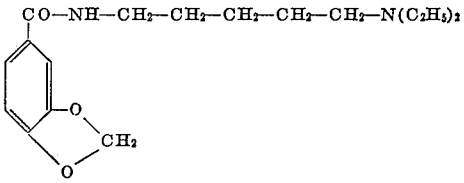

*Example 9*

An equivalent of 25% hydrogen chloride in anhydrous isopropanol is added with stirring to 12.3 g. of the above base in 35 ml. of butanone. An equal volume of anhydrous ethyl ether is added causing the separation of a gum which crystallizes upon standing in the icebox overnight. Recrystallization from isopropanol yields the hydrochloride of N-(ω-diethylaminopentyl)piperonylamide melting at about 135–140° C.

*Example 10*

The acid chloride residue obtained from 40 g. of piperonylic acid is dissolved in 400 ml. of anhydrous ethyl ether and treated with stirring by the dropwise addition of 24.5 g. of α-methyl-β-dimethylaminoethylamine. The resulting mixture is treated with 500 ml. of water. The aqueous layer is separated, rendered alkaline with sodium hydroxide solution, and extracted with ether. This ether extract is dried over anhydrous potassium carbonate, filtered, and evaporated to yield the N-(β-dimethylaminopropyl)piperonylamide as a high boiling, orange oil which has the structural formula

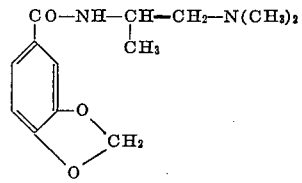

I claim:

1. The N-(lower) dialkylaminoalkyl-piperonylamides of the structural formula

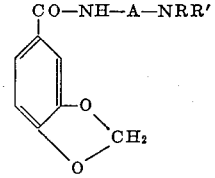

wherein A is a lower alkylene radical separating the 2 nitrogen atoms by at least 2 carbon atoms, and R and R' are lower alkyl radicals.

2. The N-(lower) diethylaminoalkyl-piperonylamides of the structural formula

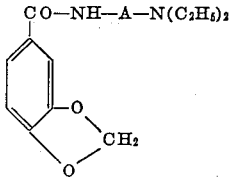

wherein A is a lower alkylene radical separting the 2 nitrogen atoms by at least 2 carbon atoms.

3. The hydrochlorides of the N-(lower) diethylaminoalkyl-piperonylamides of the structural formula

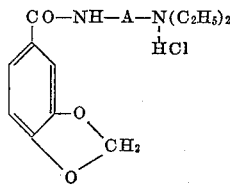

wherein A is a lower alkylene radical separating the 2 nitrogen atoms by at least 2 carbon atoms.

4. N-(β-diethylaminoethyl) piperonylamide.
5. N-(ω-diethylaminopentyl) piperonylamide.
6. N-(γ-diethylaminopropyl) piperonylamide.

References Cited in the file of this patent
UNITED STATES PATENTS

| Number | Name | Date |
|---|---|---|
| 2,251,287 | Lott | Aug. 5, 1941 |
| 2,362,128 | Gertler | Nov. 7, 1944 |

OTHER REFERENCES

Bing et al., Acta Pharmacol, Mar. 1948 #4, pp. 199–204.